United States Patent
Appelqvist et al.

(10) Patent No.: US 8,029,062 B2
(45) Date of Patent: Oct. 4, 2011

(54) SEATING SYSTEM

(75) Inventors: Roger L. E. Appelqvist, Harryda (SE); Stefan H-E. Eriksson, Alvangen (SE)

(73) Assignee: Bruno Independent Living Aids, Inc., Oconomowoc, WI (US)

( * ) Notice: Subject to any disclaimer, the term of this patent is extended or adjusted under 35 U.S.C. 154(b) by 288 days.

(21) Appl. No.: 12/267,843

(22) Filed: Nov. 10, 2008

(65) Prior Publication Data

US 2009/0121531 A1    May 14, 2009

Related U.S. Application Data

(60) Provisional application No. 61/002,681, filed on Nov. 10, 2007.

(51) Int. Cl.
*A47C 1/00* (2006.01)
*B60N 2/00* (2006.01)
*B60N 2/02* (2006.01)

(52) U.S. Cl. ............... 297/325; 297/344.1; 297/366

(58) Field of Classification Search ........... 297/325, 297/326, 327, 328, 329, 344.1, 366, 367 R, 297/370, 371
See application file for complete search history.

(56) References Cited

U.S. PATENT DOCUMENTS

| | | | | |
|---|---|---|---|---|
| 2,161,367 A * | 6/1939 | McGregor et al. | ............ | 248/394 |
| 2,594,882 A * | 4/1952 | De Rose | ............ | 248/394 |
| 4,067,533 A * | 1/1978 | Kazaoka et al. | ............ | 248/397 |
| 4,572,468 A * | 2/1986 | Lange et al. | ............ | 248/394 |
| 6,447,064 B1 * | 9/2002 | Mundy et al. | ............ | 297/313 |

* cited by examiner

*Primary Examiner* — David Dunn
*Assistant Examiner* — Philip Gabler
(74) *Attorney, Agent, or Firm* — Sylke Law Offices, LLC; C. Thomas Sylke

(57) ABSTRACT

A seating system has a tiltable seat coupled to a base, which can be coupled to a motor vehicle or other device. The seat includes a seat bracket coupled to the base by a seat tilt pivot. The seat is configured to maintain a user's body in a fixed position during tilting throughout the seat's range of tilt angles. A seat adjustment mechanism allows angular adjustment of the seat and locks the seat at a fixed tilt angle relative to the base. The seat tilt pivot axis is located approximately vertically below the center of gravity of a loaded seat, thus reducing the force needed to tilt a loaded seat. By fixing or maintaining the seat tilt pivot vertically beneath the load being pivoted, the amount of force needed to control seat tilting can be limited to forces that a typical user can exert with one or two hands.

14 Claims, 16 Drawing Sheets

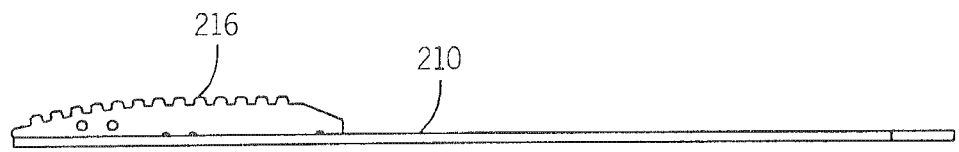
FIG. 12
FIG. 13
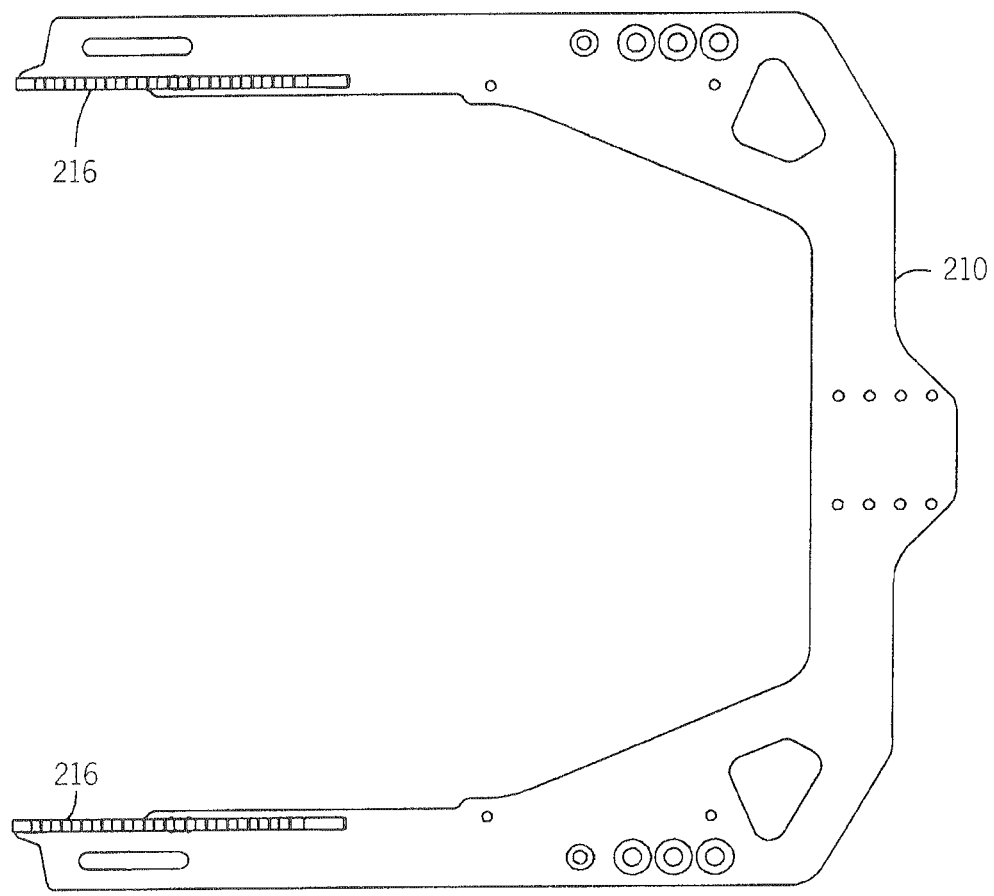

SEATING SYSTEM

CROSS-REFERENCE TO RELATED APPLICATIONS

This application claims the benefit of priority under 35 U.S.C. §119(e) and any other United States or other law of the following: U.S. Ser. No. 61/002,681 filed Nov. 10, 2007, entitled SEATING SYSTEM, the entire disclosure of which is incorporated herein by reference in its entirety for all purposes.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND

1. Technical Field

This invention relates generally to methods, systems and apparatus for seating and the like in motor vehicles and other locations, especially for use in connection with mobility devices such as movable motor vehicle seats, wheelchairs and the like.

2. Description of Related Art

Many individuals have difficulty moving in and out of motor vehicles and the like, especially passenger seats in which the user's normal riding position is such that one or both of the following conditions exist: (1) the user's feet are below the level of a door sill or other entryway lower frame member, and/or (2) the user's head extends above the level of an entryway's upper frame member. These and other factors (for example, maintaining head position, breathing, coughing, eating, car sickness, spasticity, etc.) present individuals with impaired mobility (for example, those with physical handicaps, older individuals, etc.) with challenges in using traditional seating systems and arrangements.

Systems, apparatus and techniques that provide improved seating systems and accessibility for users of motor vehicles, personal mobility vehicles and the like would represent a significant advancement in the art.

BRIEF DESCRIPTION OF THE DRAWINGS

The present invention will be readily understood by the following detailed description in conjunction with the accompanying drawings, wherein like reference numerals designate like structural elements, and in which:

FIG. 12 is a side view of a seat bracket according to one or more embodiments of the present invention.

FIG. 13 is a bottom view of the seat bracket of FIG. 12.

DETAILED DESCRIPTION

Figure 1:
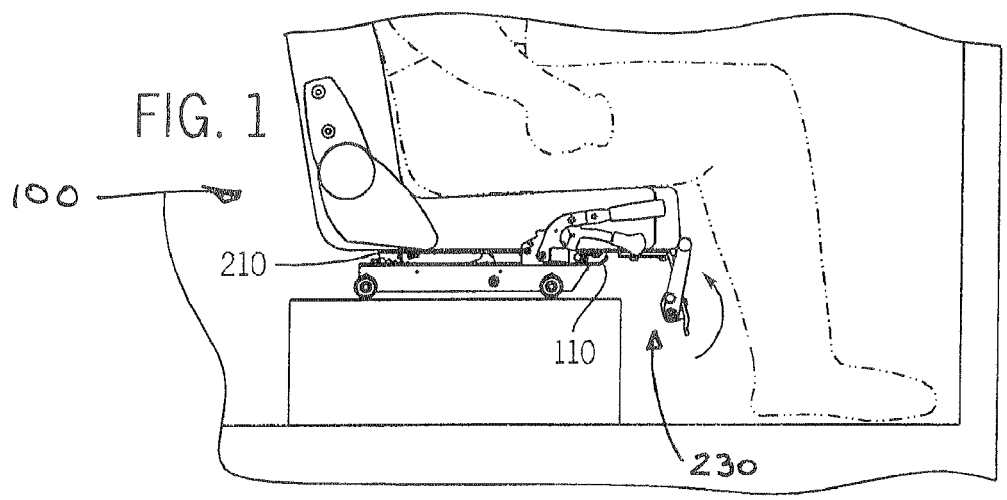
FIG. 1 is a side view of a seating system according to one or more embodiments of the present invention showing the seat in its most upright position with a folded foot support.

The following detailed description of the invention will refer to one or more embodiments of the invention, but is not limited to such embodiments. Rather, the detailed description is intended only to be illustrative. Those skilled in the art will readily appreciate that the detailed description given herein with respect to the Figures is provided for explanatory purposes as the invention extends beyond these limited embodiments. Embodiments of the invention provide seating systems that make entering and exiting a seating area (for example, a motor vehicle) easier for those with limited mobility, for example those having physical handicaps, older individuals, etc. Examples of the present invention will be shown and explained in connection with motor vehicles for illustrative purposes, but are not limited to such uses and locations.

Motor vehicle ingress and egress is improved in a motor vehicle seating system by maintaining the user's body in a generally fixed orientation during tilting of an entire "seat" (that is, a combination of a footrest, horizontal seat cushion, backrest and any headrest that are held in a fixed configuration during tilting throughout the range of available tilting angles for the seat) on a generally horizontal axis, typically parallel to the user's shoulders, thus reducing the vertical profile of the seated user without requiring the user to change body position substantially, thus facilitating ingress and egress through a motor vehicle entryway (for example, a vehicle door) or the like. Similar mounting and use arrangements can be implemented in other settings and locations, as will be appreciated by those skilled in the art. In cases where the user's physical condition, such as a handicap, inhibits the user's neck support or otherwise causes the user's head to fall down to the chest, tilting of the seat allows the user to see the road, hence lessening car sickness, improving breathing, easing coughing or other respiratory issues and simplifying eating. Tilting also can ease a user's spasticity. Moreover, earlier seating systems developed to assist user's reduce their vertical profile typically moved the user's legs and/or head relative to the user's torso, thereby causing discomfort (for example, forcing a user's legs into tight engagement against the user's chest or torso), embarrassment (for example, ladies wearing dresses and skirts were put in immodest positions during movement) and other difficulties for users.

Motor vehicle ingress and egress and other seat/user movement is improved by providing a hand lever mechanism that permits a user or other individual to change the angular orientation (that is, the tilt angle) of a loaded seat using relatively modest strength and dexterity typical of a handicapped or older individual. Further improvement is realized by positioning the pivot (axis) used to tilt the seat (the "seat tilt pivot") so that this seat tilt pivot is directly or nearly directly below the center of gravity of the "loaded" seat (that is, a seat having a user normally seated thereon). These improvements can be realized in several ways.

If a static (that is, non-translating) seat tilt pivot is used, the loaded seat center of gravity is positioned so that the center of gravity moves only a relatively small amount above the static seat tilt pivot (that is, within a small range of positions above the fixed pivot point). In other embodiments, a translating seat tilt pivot moves forward/backward during angular adjustment of the seat to allow the seat tilt pivot point to move generally in concert with the changing/moving center of gravity of the loaded seat (for example, throughout all possible seat positions or "tilt angles" in the range of seat tilt angles available with the seating system).

One example of such a device is a seating system having a base (for example, a mounting bracket or the like) that is coupled to or is configured to be coupled to a motor vehicle or other device (for example, coupled to a motor vehicle chassis, frame, transfer seat mechanism or other appropriate anchoring structure). The phrases "coupled to" and "connected to" and the like are used herein to describe a connection between two elements and/or components and are intended to mean coupled either directly together, or indirectly, for example via one or more intervening elements, where appropriate.

A tiltable seat is coupled to the base. The seat can include a seat bracket coupled to the base by a static or translating seat tilt pivot configured to tilt the seat relative to the base. The seat also can include a footrest (also referred to as a foot support), mounted to the seat bracket, to support a user's feet when the user is seated normally in the seat. While the footrest might be foldable and/or otherwise adjustable in some cases, the footrest is configured to maintain a user's feet in fixed relation to the seat bracket during tilting throughout the seat's range of tilt angles. A horizontal seat cushion may be integral to or coupled to the seat bracket. A back support is coupled to the seat bracket (for example, by mounting the back support to the seat bracket directly, to any horizontal seat cushion and/or in other ways apparent to those skilled in the art) to support the user's back when the user is seated in the seat. The back support also can include a headrest or the like, if desired. The back support is configured to be maintained in a fixed relation to the seat bracket during tilting throughout the seat's range of tilt angles.

A seat tilt adjustment mechanism (or "seat adjustment mechanism") coupling the seat to the base allows angular adjustment of the seat relative to the base and locks the seat at a fixed tilt angle relative to the base. The locking mechanism can use a variety of structures. One locking mechanism configuration uses a locking plate coupled to the base. The locking plate has a plurality of discrete locking positions, each of which can be engaged by a manually operated, spring-mounted (or "spring-loaded") locking pin mounted to a cam rod beneath the seat bracket. As the cam rod is raised or pivoted upward, the seat tilts back to one of the tilt angle locking positions within a range of tilt angles. Likewise, lowering or pivoting the cam rod downward tilts the seat into a more upright position. This discrete locking position seat tilt adjustment mechanism allows the seat's tilt angle to be changed and fixed relative to the position of the mounting bracket at one of a variety of discrete locking positions. Another embodiment of the invention uses a lockable gas spring or the like to permit a range of continuous (rather than discrete) angular locking positions.

In some embodiments the seat tilt pivot, that is the axis about which the seat tilts relative to the base, is located approximately vertically below the center of gravity of a loaded seat, thus reducing the force needed to tilt a loaded seat. By fixing or maintaining the seat tilt pivot nearly or directly vertically beneath the load being pivoted, the loaded seat center of gravity (whether using a static seat tilt pivot or a translating seat tilt pivot), the amount of force (torque) needed to control seat tilting through a full range of tilt angles can be limited to forces that a typical user can exert with one or two hands.

FIGS. 1-7 show a vehicle seat system 100 according to one or more embodiments of the present invention. In FIGS. 1-5, the motor vehicle seating system 100 is mounted in and coupled to a motor vehicle 90 (for example, an automobile, minivan, SUV, truck or other vehicle) as the passenger-side seating position of the front seating area of an automobile. The motor vehicle 90 has a doorway having a lower sill or other entry border 92 and an upper entry border 94, for example the edges of a motor vehicle door frame. Motor vehicle pillars (for example, the A-pillar and B-pillar) may also define the doorway of motor vehicle 90. Other seating settings having dimensional limits and/or constraints are also appropriate locations for use of embodiments of the present invention.

Figure 2:
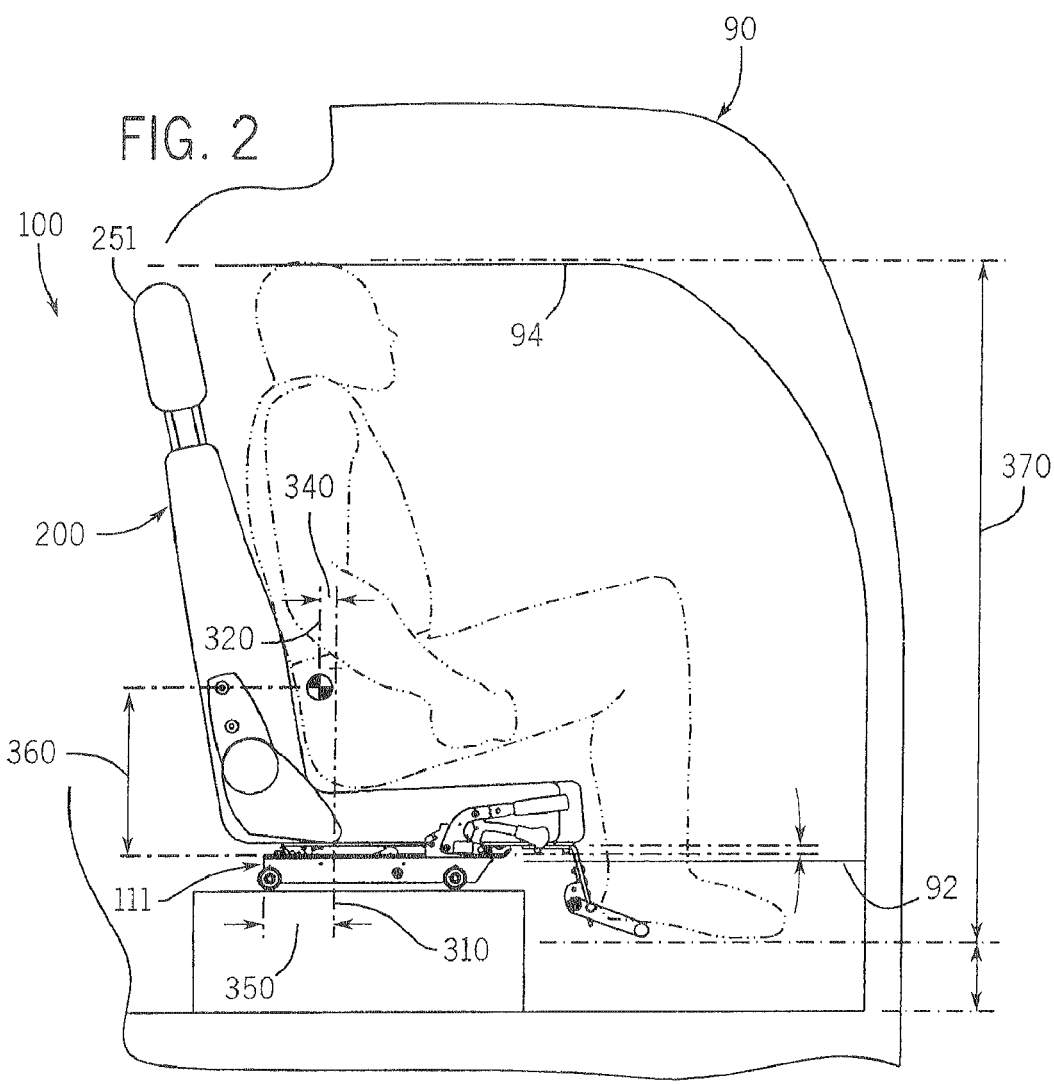
FIG. 2 is a side view showing the seating system of FIG. 1 with a folded down foot support and a rack and pinion based translating seat tilt pivot.

The seat 200 of a motor vehicle seating system 100 is in its most upright position in FIG. 1 (that is, seat 200 is not tilted back at all). As seen in FIG. 2, the user's head cannot clear upper frame member 94 and, likewise, the user's feet are below the level of lower frame member 92. System 100 has a mounting bracket 110 as its base coupled to the motor vehicle 90 and a tiltable seat 200 coupled to the mounting bracket 110. One configuration for anchoring the vehicle seat system 100 to the motor vehicle 90 includes a transfer seat system such as the CARONY™ or TURNOUT™ seating system 111 made and sold by Autoadapt AB of Sweden and Bruno Independent Living Aids, Inc. of Oconomowoc, Wis. Such a transfer seat system 111 allows the motor vehicle seat to be rotated and moved outside the motor vehicle 90 to assist a user in entering and/or exiting the motor vehicle 90. Other such transfer seating systems are known to those skilled in the art. The system can also be used separately, installed directly under the seat of a wheelchair, utilizing all the ergonomic features discussed herein.

Moreover, this highlights the versatility of the present invention. A seating system according to one or more embodiments of the present invention can be used as part of a wheelchair or other personal mobility vehicle (for example, a scooter or power wheelchair) where the mounting bracket is coupled to the personal mobility vehicle rather than a typical motor vehicle. Also, the seat 200 of the various embodiments shown and discussed herein can be a portable seat that can be transferred between a motor vehicle 90 and a personal mobility vehicle platform, further improving mobility for those facing physical challenges. As will be appreciated by those skilled in the art, such a portable seat must meet any applicable requirements for motor vehicle seats in general.

As seen in FIGS. 6-15, the mounting bracket 110 comprises a whole or partial plate 112 that can include one or more cutouts or other spaces 114 for seating adjustments and equipment accommodation, and may be formed using a welded, bolted, unitary or other construction configuration. A locking plate 116, part of a seat tilt adjustment mechanism, is positioned on the left or right side of the seat (or both sides) to assist with adjusting tilting of the seat. Plate 116 includes a plurality of locking positions (for example, notches or stops) 118, each of which function as a locking slot or point for the tiltable seat at various tilt angles relative to the mounting bracket 110. Mounting bracket 110 also includes a pair of racks 120 used as part of a rack and pinion system in some embodiments, which will be explained in more detail below. In embodiments where a static seat tilt pivot is used, the mounting bracket 110 can include a static hinge or other pivot mechanism around which seat 200 tilts but which does not move relative to the mounting bracket 110.

As noted above, the mounting bracket 110 is coupled to the motor vehicle, meaning that mounting bracket 110 can be secured directly to the motor vehicle 90 or can be secured to the motor vehicle 90 via additional equipment, such as additional seating system apparatus or a transfer seat apparatus. Again, as an example, in some of the Figures, the mounting bracket 110 is mounted to a CARONY™ or TURNOUT™ seating system 111, which can move the seat to a position outside the motor vehicle 90 (including, for example, rotating seat 200 about a vertical axis to move the user outward from a front-facing position relative to the motor vehicle 90.

Seat 200 includes a seat bracket 210 that is coupled to mounting bracket 110 using a seat tilt pivot as a pivoting mounting means. In the Figures, seat bracket 210 is pivotably mounted to mounting bracket 110 using a seat tilt pivot that limits the minimum and maximum angular adjustment permitted for the seat 200. The limiting pivot in FIGS. 1-7, 14 and 15 uses elongated holes 212 in supports 213 (supports 213 are fixed to mounting bracket 110 adjacent to the rack 120 structure). Pin-type members 214 (for example, screw and sleeve combinations) on each pinion 216 of seat bracket 210 engage the holes 212, as seen in more detail in FIGS. 14 and 15. Elongated holes 212 act as guides for pin-type members 214, controlling the pivoting motion of the seat bracket 210. In the embodiment shown in the Figures, the geometry for each guide hole 212 can be generated by an arc tangent to the cylindrical members 214 and based on the curvature of the pinion 216, limiting the arcuate travel of the seat bracket 210 between its horizontal (most upright seat position) and any angular limit(s), as the pinion 216 moves while engaging the rack 120.

This configuration permits limited travel of members 214 within holes 212, thus limiting the minimum and maximum tilting positions of the seat bracket 210 relative to the mounting bracket 110. This configuration also limits free motion (that is, looseness) of the seat 200 and prevents the pinion 216 from disengaging from the rack 120, thus solving an important consideration in a very simple way. This configuration also absorbs crash and/or other forces that might negatively affect a user seated in seat 200. As will be appreciated by those skilled in the art, this also permits a manufacturer, installer, etc. to adjust and/or control the free motion in a given seating configuration for a given user or application.

Figure 6:
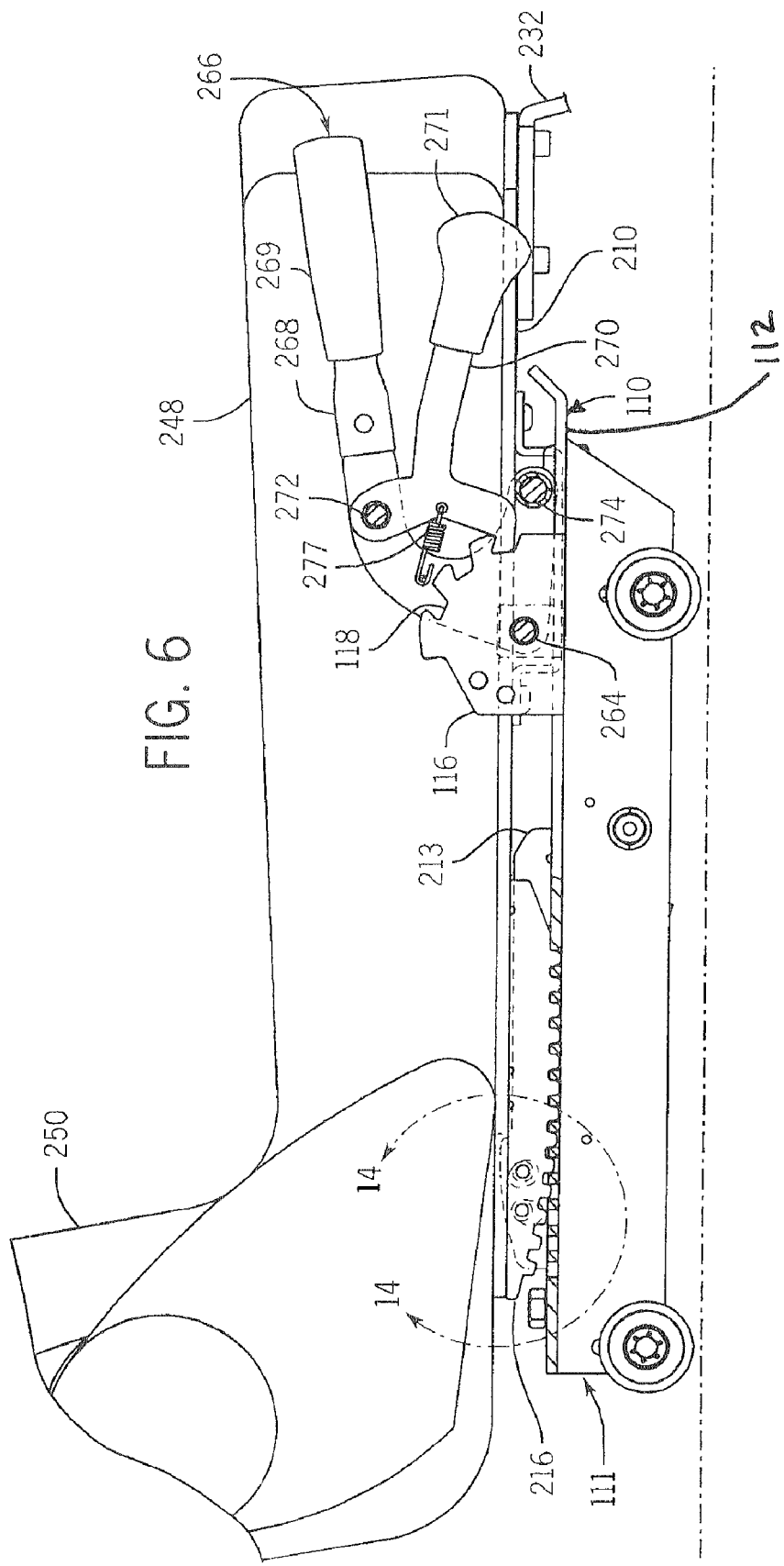
FIG. 6 is a side view of a mounting bracket having a tiltable seat coupled thereto using a translating seat tilt pivot and a seat tilt adjustment mechanism therefor.
Figure 7:
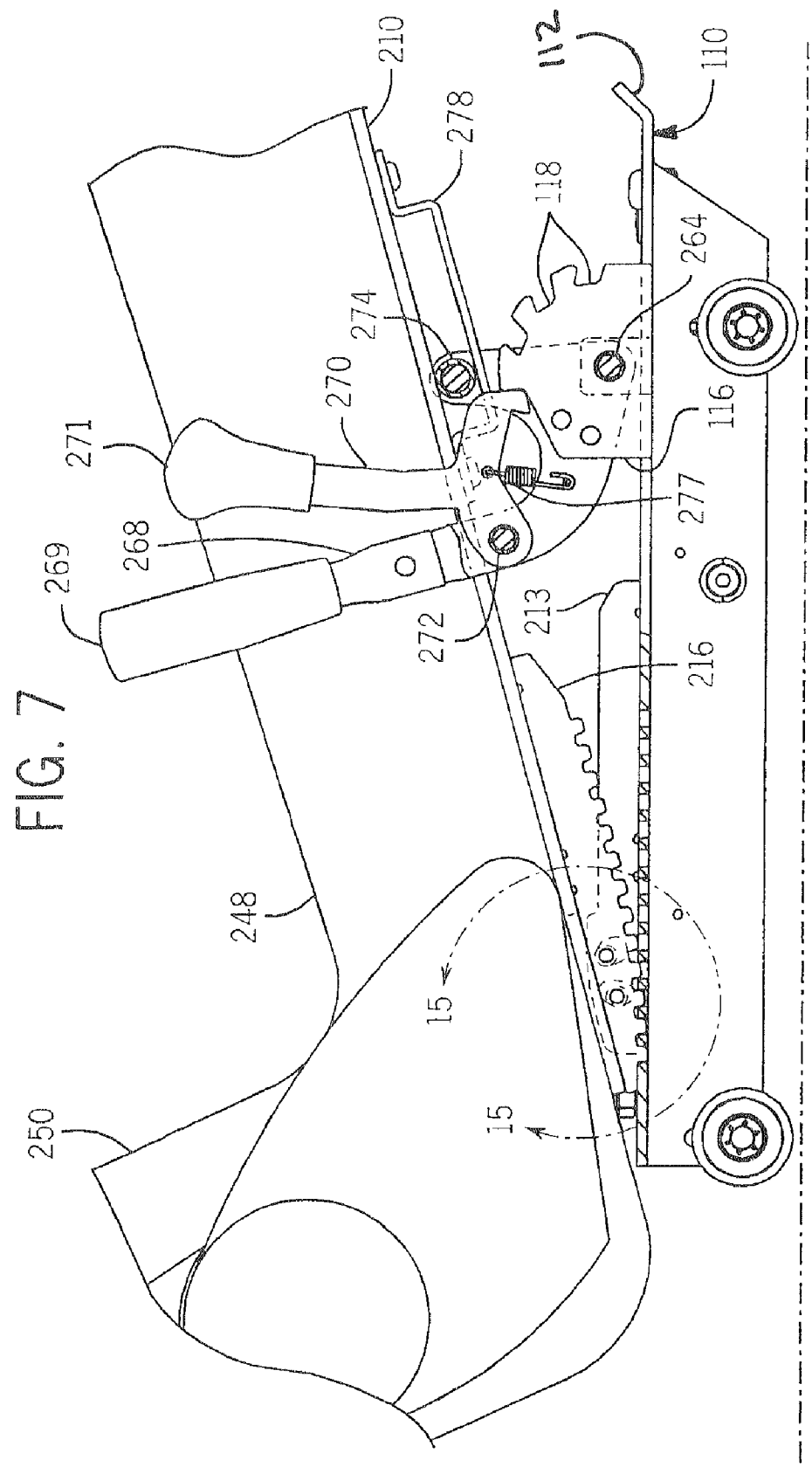
FIG. 7 is a side view of a mounting bracket having a tiltable seat coupled thereto using a translating seat tilt pivot and a seat tilt adjustment mechanism therefor.
Figure 8:
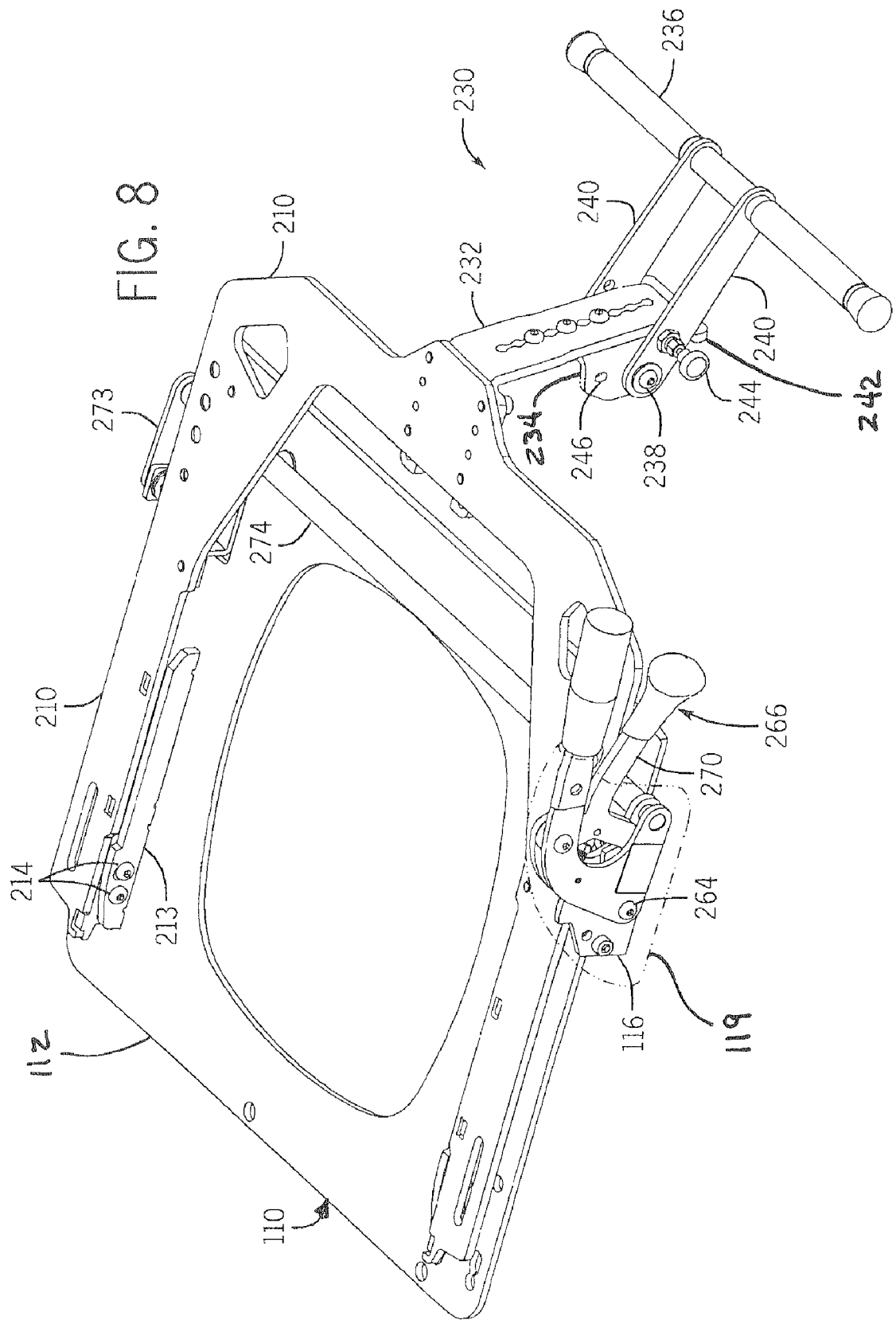
FIG. 8 is a perspective view of a mounting bracket and seat bracket according to one or more embodiments of the present invention.
Figure 9:
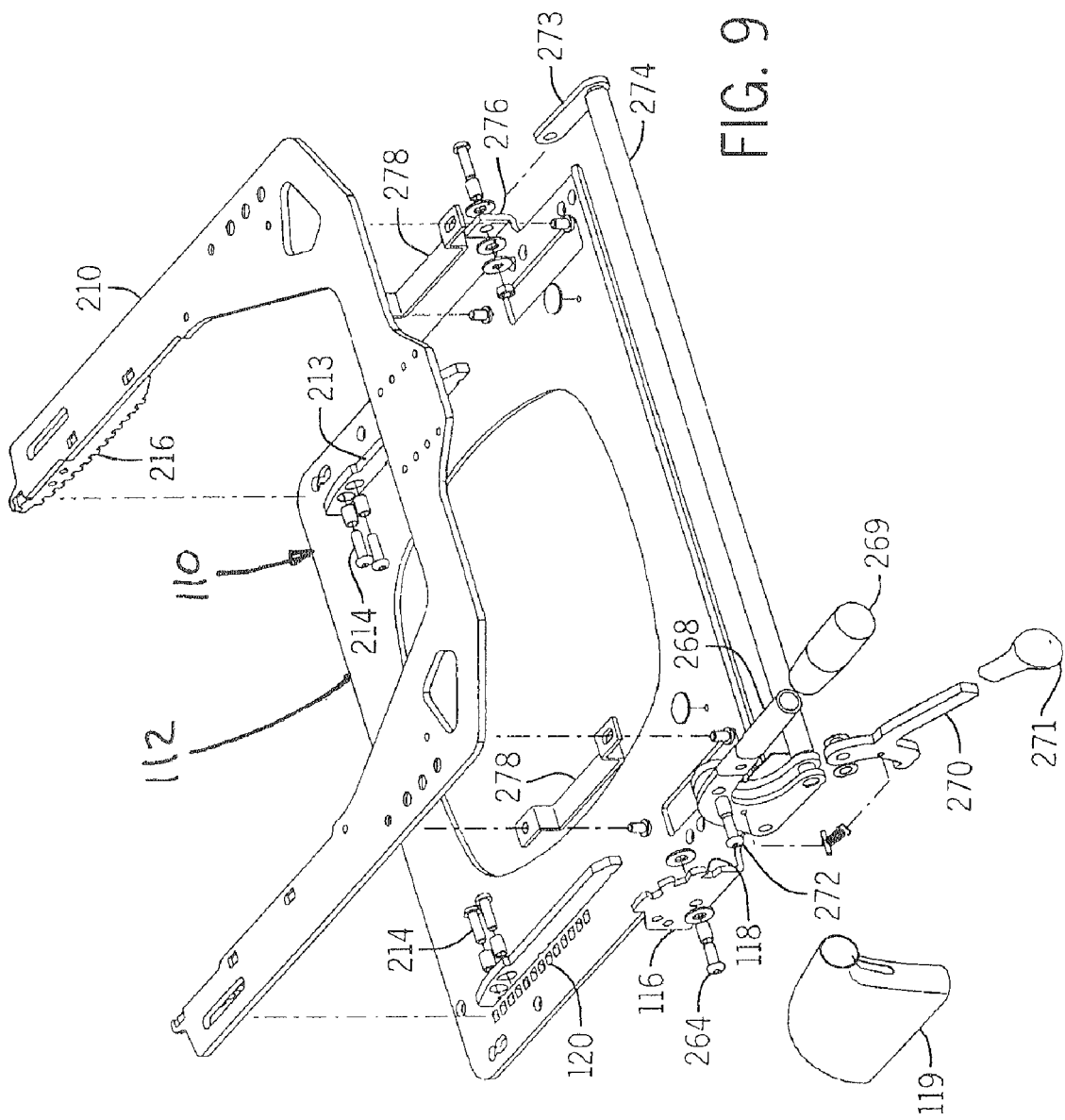
FIG. 9 is an exploded view of the mounting bracket and seat bracket of FIG. 8.
Figure 10:
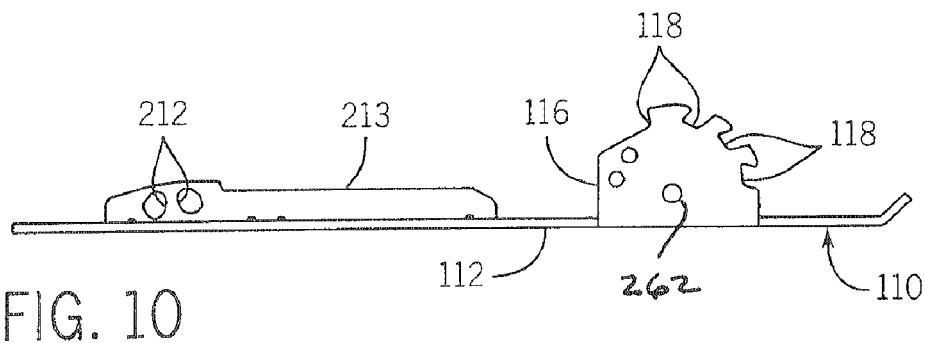
FIG. 10 is a side view of a mounting bracket according to one or more embodiments of the present invention.
Figure 11:
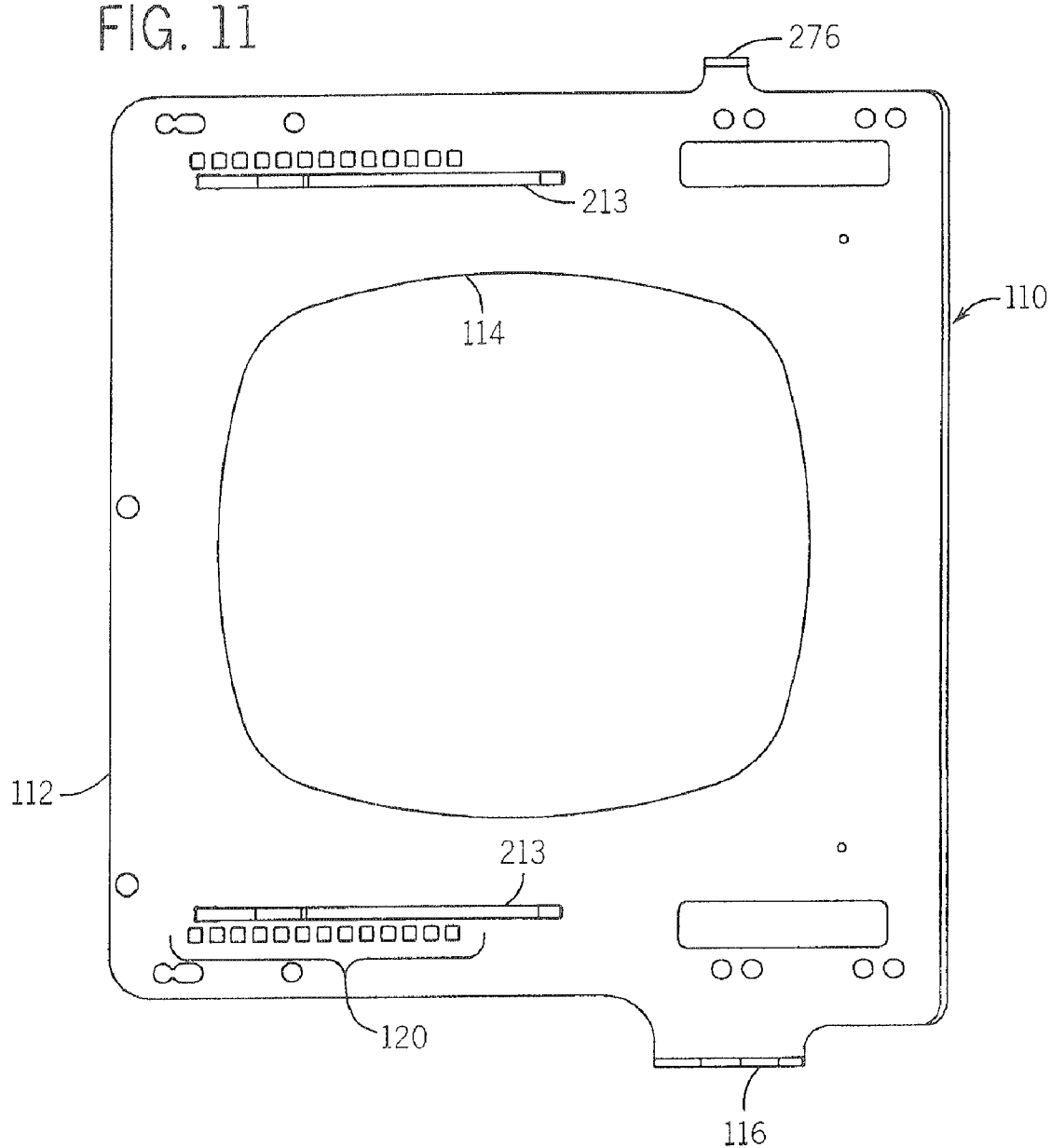
FIG. 11 is a top view of the mounting bracket of FIG. 10.
Figure 14:
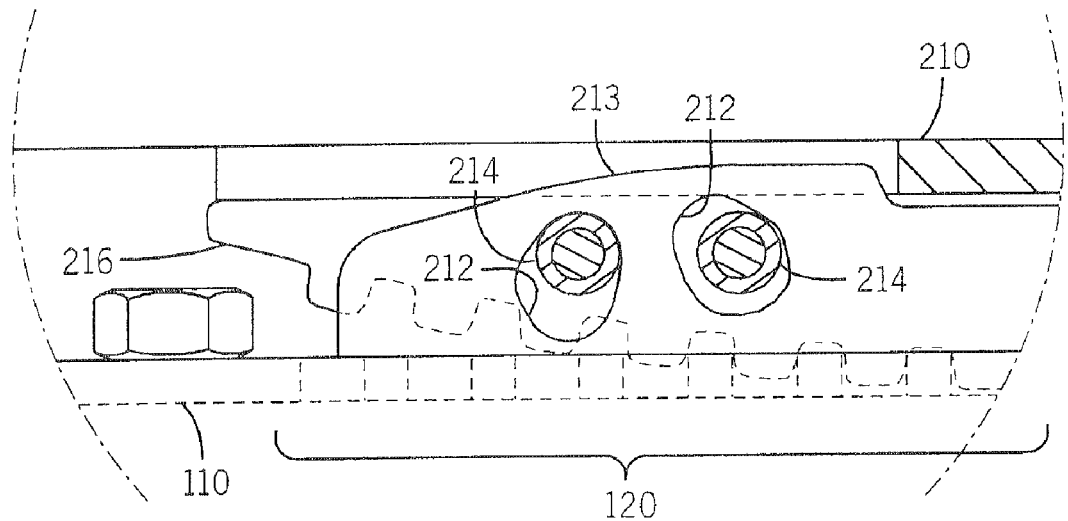
FIG. 14 is a detailed view of at least a portion of a translating seat tilt pivot per line 14-14 of FIG. 6.
Figure 15:
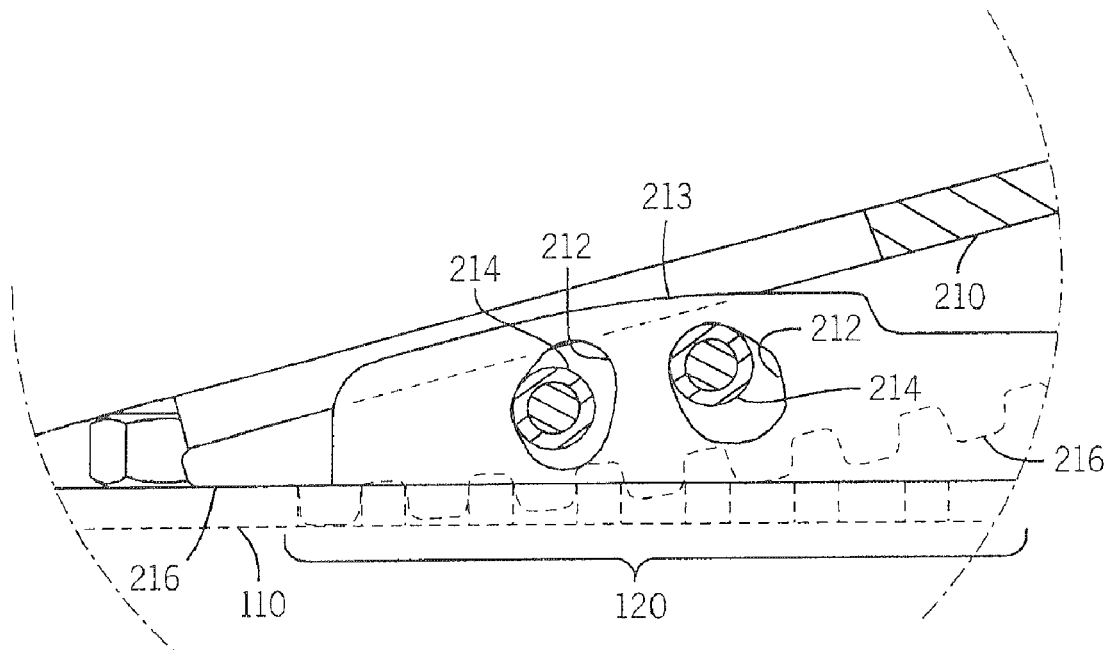
FIG. 15 is a detailed view of at least a portion of a translating seat tilt pivot per line 15-15 of FIG. 7.

In the configuration shown in FIGS. 1-7, the rack 120 and pinion 216 structure creates a translating or "moving" seat tilt pivot point 310 for tilting seat 200. That is, the axis of rotation of the seat 200 relative to the mounting bracket 110 translates laterally during seat tilting (for example, moving backward—horizontally to the left in FIGS. 1-5—as the seat is tilted back to a more reclined position), as will be explained in more detail below. Other seat tilt pivots will be apparent to those skilled in the art and not all seat tilt pivots are required to move or translate during tilting (that is, the seat tilt pivot can be a non-translating, static pivot axis). As can be seen in FIG. 8, the inner edge of the seat bracket 210 and the upper edge of each support 213 also engage to inhibit rotation of the seat 200 relative to the mounting bracket 110 about a vertical axis. Moreover, supports 213 reinforce seat bracket 210 and shield the rack 120 and pinion 216 from debris and other obstructions (for example, pens, coins, etc.) that might otherwise interfere with operation of the seat tilting apparatus.

Figure 16:
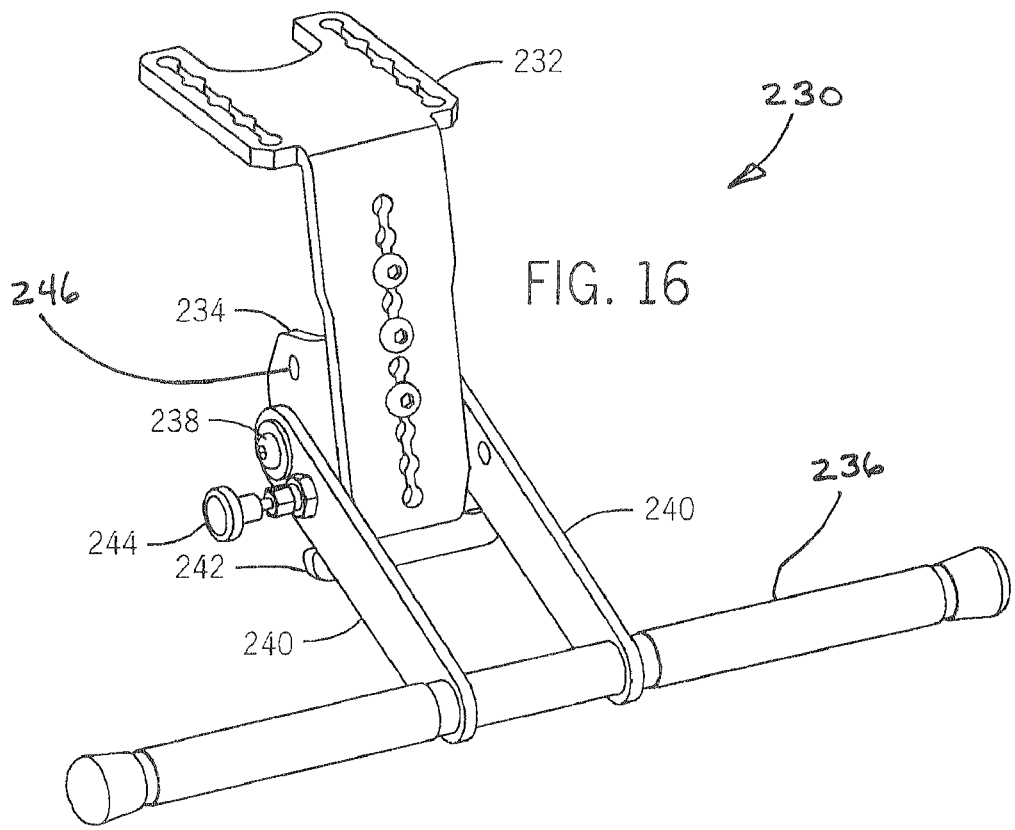
FIG. 16 is a perspective view of a foot support assembly according to one or more embodiments of the present invention.
Figure 17:
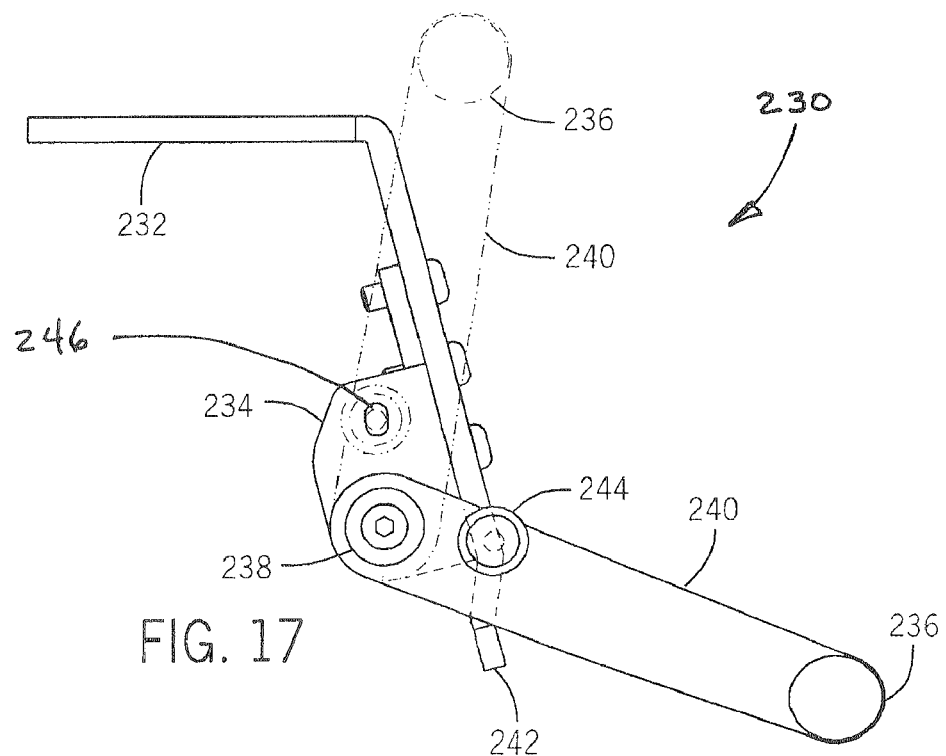
FIG. 17 is a side view of the foot support assembly of FIG. 16.

As seen in FIGS. 6, 16 and 17, a foot support assembly 230 (also referred to as a "footrest assembly") is coupled to the front of seat bracket 210. Foot support assembly 230 has an angle bracket 232 fixed to the seat bracket 210 using a plurality of set screws and adjustment holes, thus permitting forward/backward lateral adjustment of the footrest assembly 230 relative to seat bracket 210 (such forward/backward lateral adjustment of the footrest assembly 230 also helps adjust for the length of a user's legs). As used herein, the meaning of "fixed" includes configurations in which two or more components are held in a static relation relative to one another during normal use (for example, during tilting of the seat within its available range of tilt angles), but can selectively be adjusted by the user or other individual (for example, for fitting, folding for storage, changing users, etc.) when appropriate. A second angle bracket 234 is fixed to the first angle bracket 232 using another plurality of set screws and adjustment holes. Finally, a pair of pivot screws 238 pivotably mount a footbar assembly to angle bracket 234, where the footbar assembly can include a pair of parallel spacing braces 240 and a footbar 236.

The parallel braces 240 of the footbar assembly rest against a stop 242 on angle bracket 234 to support a user's feet during use (for example, during tilting of the seat). However, as seen in FIG. 2, the footbar 236 also can be folded up and locked in a storage position by using a lock pin 244 on each brace 240 and lock hole 246 on angle bracket 234. The combination of adjustment structures in footrest assembly 230 permits adjustment of the footbar 236 so that it is at an appropriate height and angle for a user seated in seat 200. The footbar 236 also can be replaced with other types of user foot supports such as tubes, plates (cupped or flat), nets or belts, as will be apparent to those skilled in the art.

As also will be appreciated by those skilled in the art, the seat bracket 210 and footrest assembly 230 of seat 200, as shown in the Figures, provide a fixed configuration for a user seated in seat 200 during tilting of the seat throughout its range of tilt angles. That is, the user's feet remain in the same position relative to the rest of the user's body when the user is normally seated in seat 200 and has his/her feet on the open footbar (unfolded) 236.

Seat 200 can include a generally horizontal seat cushion 248 (or other appropriate horizontal structure that accommodates the comfort and support needs of users) and a backrest 250 mounted to cushion 248 and/or seat bracket 210. The cushion 248 and backrest 250 can be adjustable relative to one another, if desired, but maintain a user's entire body in a fixed position during tilting throughout the range of available seat tilt angles and, if desired, operation of the motor vehicle 90. Backrest 250 may include a headrest 251 as well.

In summary, seat 200 is configured to maintain the body position of a user seated on the seat throughout the range of tilt angles, without the need to "bunch up" a user's feet or legs toward the user's torso nor bending of the user's head to an uncomfortable or otherwise undesirable configuration. That is, the user's feet maintain their position relative to the user's torso throughout the range of tilt angles and the user's hip and knee flexion angles are maintained. Moreover, the user's head maintains its position relative to the user's torso throughout the range of tilt angles.

A seat tilt adjustment mechanism provides adjustment of the tilt angle (that is, angular position) of the seat 200 relative to a base such as mounting bracket 110 (and thus a motor vehicle doorway or other location, for example, for ingress/egress). In some embodiments of the present invention, this adjustment is performed manually using a hand lever and lock combination that controls a cam apparatus under seat bracket 210. In other embodiments, adjustment can be performed using electric or other non-manual means that can be substituted for manual means disclosed herein to adjust and lock the angular position of the seat. For example, adjustment and locking can be performed without the need for discrete locking points or slots if a continuous adjustment mechanism is desired, such as a lockable gas spring or the like. Moreover, a motor or other power means controlling rotation of the seat tilt pivot can be implemented in lieu of the handle-based mechanism shown in FIGS. 1-9. A wide variety of seat adjustment means will be apparent to those skilled in the art, including the disclosed seat tilt adjustment mechanism, etc.

As noted above, and as seen in FIGS. 6, 7, 9 and 10, mounting bracket 110 includes a locking plate 116 with a plurality of locking positions 118. Plate 116 has a pivot hole 262 holding a pivot 264 (for example, a screw, bolt, sleeve, pin, etc.) that acts as a cam pivot point coupled to a handle assembly 266. Handle assembly 266, shown in detail in FIGS. 6-9, includes a handle 268 (which can include a rubber grip 269 or the like) pivotable about pivot 264 and a pawl-like latch 270 that pivots relative to handle 268 using another pivot 272 (for example, a screw, bolt, sleeve, pin, etc.). Handle assembly 266 and locking plate 116 are similar in appearance to a ratchet and pawl and function as described below. Handle 268 can be formed of two parallel plates between which latch 270 is held using pivot 272. Handle assembly 266 can be covered to protect a user's hand and to protect the handle mechanism from dirt, etc. using a hood 119 or the like.

Latch 270 (which can include a rubber grip 271 or the like) is biased into engagement with one of the locking positions 118 in locking plate 116, for example using a spring 277 as a biasing means. Handle 268 holds a cam rod 274 which can include an inner rod element covered by a cam surface. This cam surface can be any suitable material, for example a high molecular weight or other low friction material. Rod 274 uses a lever arm 273 (for example, a bracket or the like) to rotatably engage a bracket 276 on the side of mounting bracket 110 opposite the locking plate 116. Handle 268 provides a similar lever arm to provide the lever offset on the other side of the seat 200. In some embodiments, handle assembly 266 is on the right hand side of motor vehicle seating system 100, in other embodiments assembly 266 is on the left hand side of system 100, and in even other embodiments, there may be a locking plate and corresponding handle assembly, that is a seat tilt adjustment mechanism, on both sides of the motor vehicle seating system 100. Where seat tilt adjustment mechanisms are placed on both sides of a seat 200, the handles 268 provide the lever arms for cam rod 274 and matching sets of locking positions 118 are provided for matching handle assemblies 266.

As will be appreciated by those skilled in the art, latch 270 engages a given locking position 118 to hold handle 268 and rod 274 in a locked position; this likewise holds seat 200 in a locked angular position with regard to the mounting bracket 110 as well. As it is rotated upward by a user or other individual, rod 274 applies an upward force on a forward portion of the underside of seat bracket 110, as seen in FIG. 7, thus tilting the seat 200 back. One or more brackets 278 can be used to hold rod 274 in sliding engagement with seat bracket 210, as seen in FIG. 7. Brackets 278 also prevent seat 200 from lifting up off of the cam rod 274 in an undesirable manner.

Figure 25:
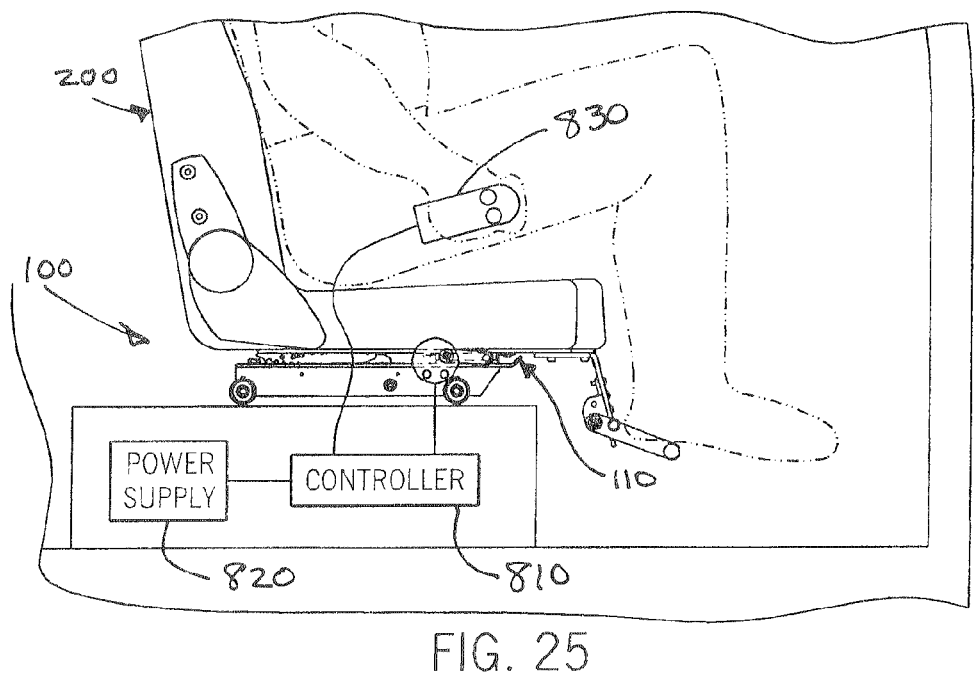
FIG. 25 is a side view of a seating system according to one or more embodiments of the present invention using a power seat tilt adjustment mechanism.

The manually operated seat tilt adjustment mechanism can be replaced in some embodiments by a power seat tilt adjustment mechanism, as seen in FIG. 25. In the power seat tilt adjustment mechanism of FIG. 25, a controller 810 operates tilting of the seat 200 using a power supply 820 and a control switch 830 that a user or other individual can operate. The power seat tilt adjustment mechanism can utilize electrical, pneumatic, hydraulic, etc. components and can use either discrete locking positions or a range of continuous locking positions for locking the seat at a given tilt angle.

Figure 24:
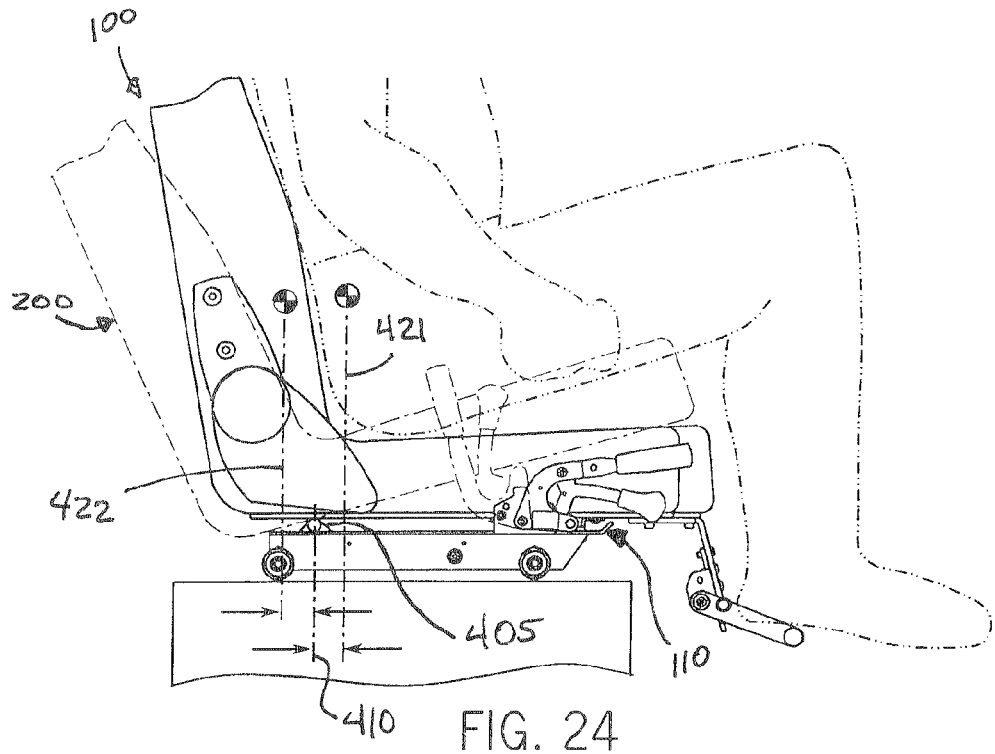
FIG. 24 is a side view of a seating system according to one or more embodiments of the present invention using a static seat tilt pivot.

As noted above, a static seat tilt pivot can be used in some embodiments of the present invention. As seen in FIG. 24, a static seat tilt pivot can be a hinge 405 or the like coupling the seat bracket 210 to a base such as mounting bracket 110. Such a hinge 405 can define and/or limit the range of tilt angles available to a user or other individual when adjusting the position of seat bracket 210 relative to mounting bracket 110 (whether a discrete or continuous position locking mechanism is used). The center of gravity of the loaded seat 200 is kept close to being directly above the pivot point 410 of hinge 405 as is practical, thus reducing the amount of force required to control pivoting and to use an acceptable amount of physical strength to adjust the angular position of the seat 200.

In the embodiment shown in FIG. 24, a first limit 421 of the lateral travel of the center of gravity point of a loaded seat is established when the seat 200 is in its most upright position. A second limit 422 of the loaded seat center of gravity is established when the seat is reclined as fully as allowed by the seat tilt adjustment mechanism and/or any other apparatus used.

Thus the center of gravity moves within a range (that is, between points 421 and 422) established by the range of tilting angles of the seat 200. With a static seat tilt pivot, the seat tilt pivot point 410 can be set as seen in FIG. 24 so that the loaded seat center of gravity moves within a range of positions where the seat tilt pivot point is a point 410 directly vertically below the center of gravity's range of positions.

In other embodiments, a translating seat tilt pivot can be used. In FIG. 2 the horizontal separation between the seat tilt pivot point 310 and loaded seat center of gravity 320 is denoted as space 340 between the illustrated arrows (and may also be referred to herein as the "pivot gap"). The horizontal separation between pivot point 310 and the rear edge of mounting bracket 110 is denoted as gap 350. Gap 350 helps to illustrate the translation of the seat tilt pivot position 310 throughout the range of tilt angles of seat 200. Moreover, separation 350 also can be used to determine the horizontal separation between the loaded seat center of gravity 320 position and the rear edge of mounting bracket 110.

The vertical separation between the mounting bracket 110 and the loaded seat center of gravity 320 is denoted by arrow 360. Finally the vertical profile of the user seated in seat 200 is denoted by arrow 370. As will be appreciated by those skilled in the art, the curvature of each pinion 216 and its engagement with its corresponding rack 120 determine the translation characteristics of the seat tilt pivot. That is, by changing the radius of curvature of the pinions 216 in the example shown in FIGS. 1-7, the lateral movement of the seat tilt pivot for a given tilt angle Θ can be controlled. Moreover, selection of mounting holes for each pinion 216 on seat bracket 210 can provide additional control over the seat tilt pivot's characteristics and behavior, including horizontal movement of the loaded seat center of gravity as compared to the seat tilt pivot position.

FIGS. 2-7 illustrate the rack and pinion based translating seat tilt pivot and its use in conjunction with the loaded seat center of gravity in a seating system. In FIG. 2, where loaded seat 200 is in its fullest upright position, the seat tilt pivot point 310 is slightly forward of the loaded seat center of gravity 320. In an exemplary configuration, the height 360 of the center of gravity can be 270-mm above the mounting bracket 110, where the pivot gap separation 340 has the loaded seat center of gravity 320 being 25-mm behind (to the left in FIG. 2) of the seat tilt pivot point 310. A loaded seat center of gravity can vary from user to user, but close approximations for a known user (for example, during installation and fitting of a seating system for a particular user in a particular vehicle or location) and/or a hypothetical user (for example, for use in a taxi-van, taxicab or other multi-user vehicle or location) can be used to ensure that the translating seat tilt pivot point 310 and loaded seat center of gravity 320 are nearly vertically coincident or, in another sense, are close enough to allow operation of the seating system by a person having limited strength and dexterity. By selecting the appropriate geometry of the rack 120 and pinion 216 structure and the center of gravity of the loaded seat, the seat tilt pivot is located approximately vertically below a loaded seat center of gravity throughout the range of tilt angles.

Figure 3:
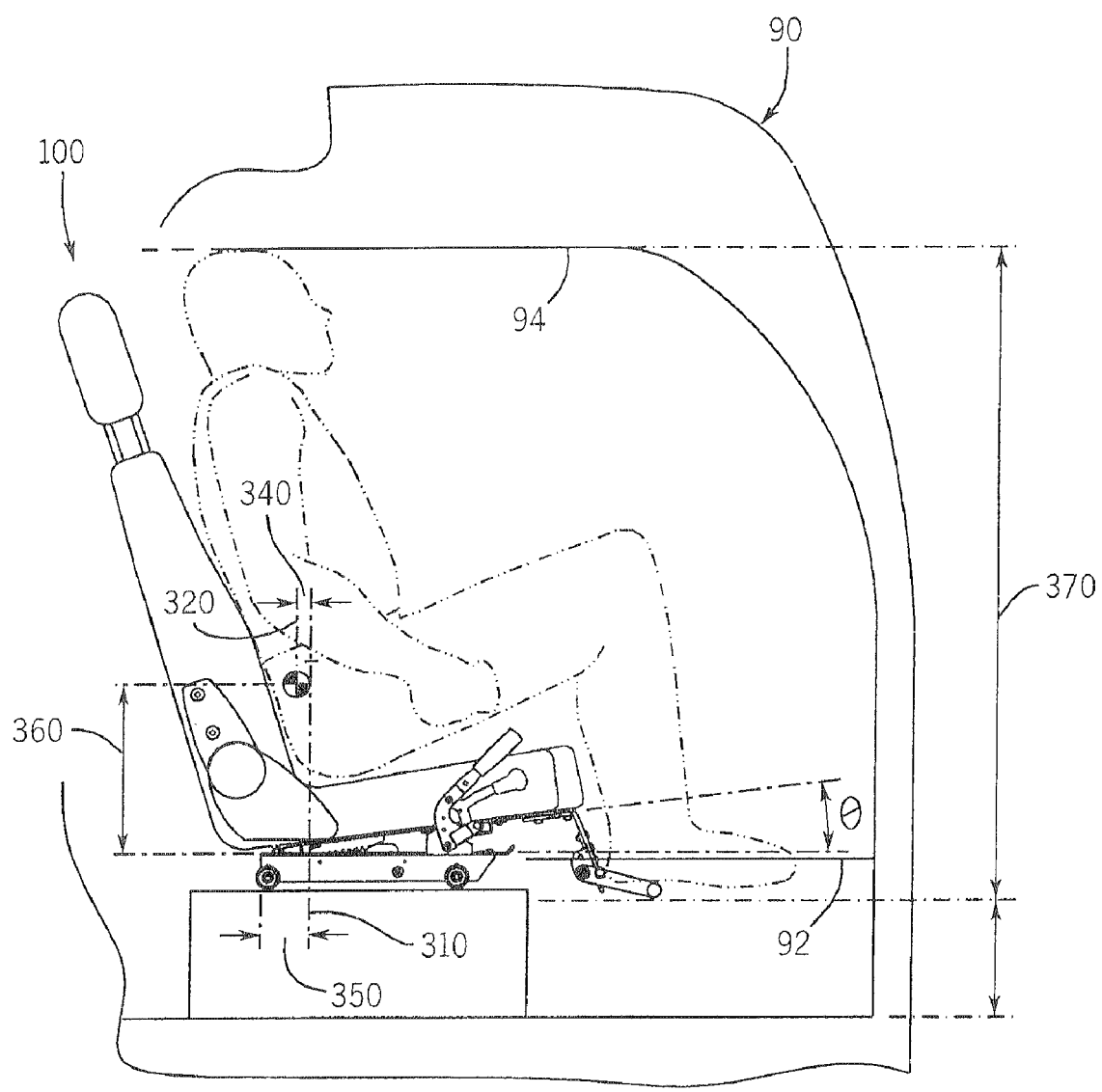
FIG. 3 is a side view of the seating system of FIG. 2 showing the seat tilted back at a 7° angle.
Figure 4:
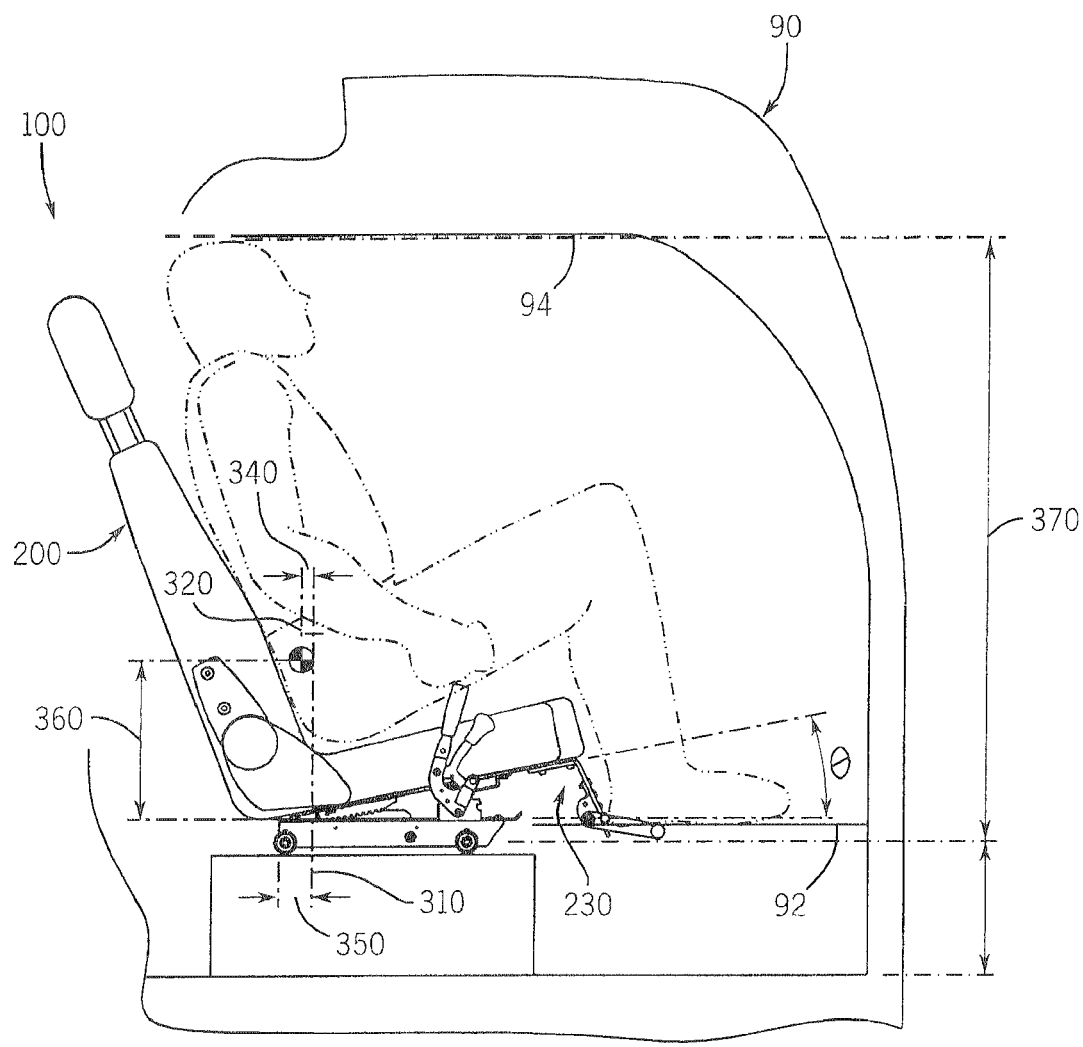
FIG. 4 is a side view of the seating system of FIG. 2 showing the seat tilted back at an 11° angle.
Figure 5:
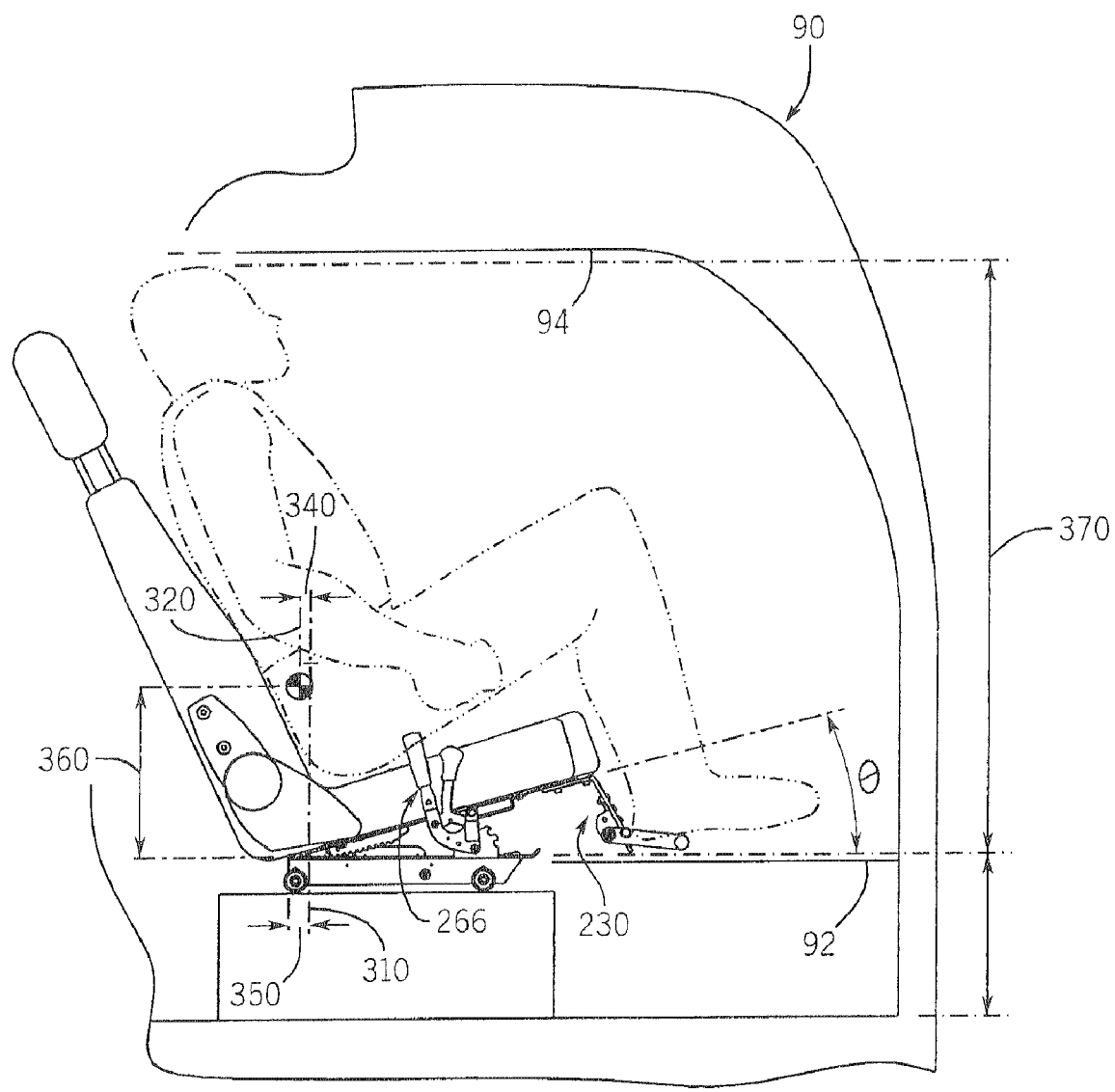
FIG. 5 is a side view of the seating system of FIG. 2 showing the seat tilted back at a 15° angle.

In FIG. 3 the seat 200 has been tilted by a tilt angle Θ, here 7° for example (the tilt angle Θ was 0° in FIG. 2), causing the seat tilt pivot 310 created by rack 120 and pinion 216 to move rearward (to the left in FIG. 3). The tilting of seat 200 loaded with its user also has caused the loaded seat center of gravity 320 to move rearward. Using the exemplary numbers from the configuration noted in connection with FIG. 2 above, the height 360 has been shortened to 267-mm, while the pivot gap 340 between the loaded seat center of gravity 320 and seat tilt pivot point 310 has also shortened to 22-mm. Angle Θ has been increased to 11° in FIG. 4, causing the height 360 of the center of gravity to shorten to 266-mm, while the loaded seat center of gravity 320 and seat tilt pivot point 310 are now separated at 340 by only 19-mm. FIG. 5 shows full (reclining) tilting of loaded seat 200 where Θ is now 15°. In FIG. 5, center of gravity height 360 is 265-mm, while the pivot gap separation 340 between the loaded seat center of gravity 320 and seat tilt pivot point 310 is 16-mm.

As will be appreciated by those skilled in the art, the loaded seat center of gravity 320 and seat tilt pivot point 310 stay close enough throughout the range of tilting angles of seat 200 that relatively little force is required to control tilting of seat 200 backward or forward. Locking positions 118 in plate(s) 116 allow for a number of angular adjustment/locking positions for seat 200 and provide any easily implementable and usable seat tilt adjustment mechanism for use in connection with seating system 100. Other translating seat tilt pivot point structures will be apparent to those skilled in the art and can be used in lieu of the rack 120 and pinion 116 structure illustrated in FIGS. 2-7 and described herein.

Considering FIGS. 2-5 again, the vertical profile 370 of the user can be seen to decrease throughout the tilting back of the seat 200. Using the numbers of the exemplary configuration note above, the user's vertically profile 370 can be reduced 6-7 inches (on the order of 16-17 cm). As can be seen in FIGS. 2 and 5, the user's head and feet are outside the frame 92, 94 of the doorway of motor vehicle 90 in FIG. 2. When the user's body is tilted back by 15°, as seen in FIG. 5, the change in the user's vertically profile 370 moves the user's feet above the lower frame member 92 and moves the user's head below the upper frame member 94. This is done without requiring any movement of the user's feet and/or head relative to the remainder of the user's body.

Figure 23:
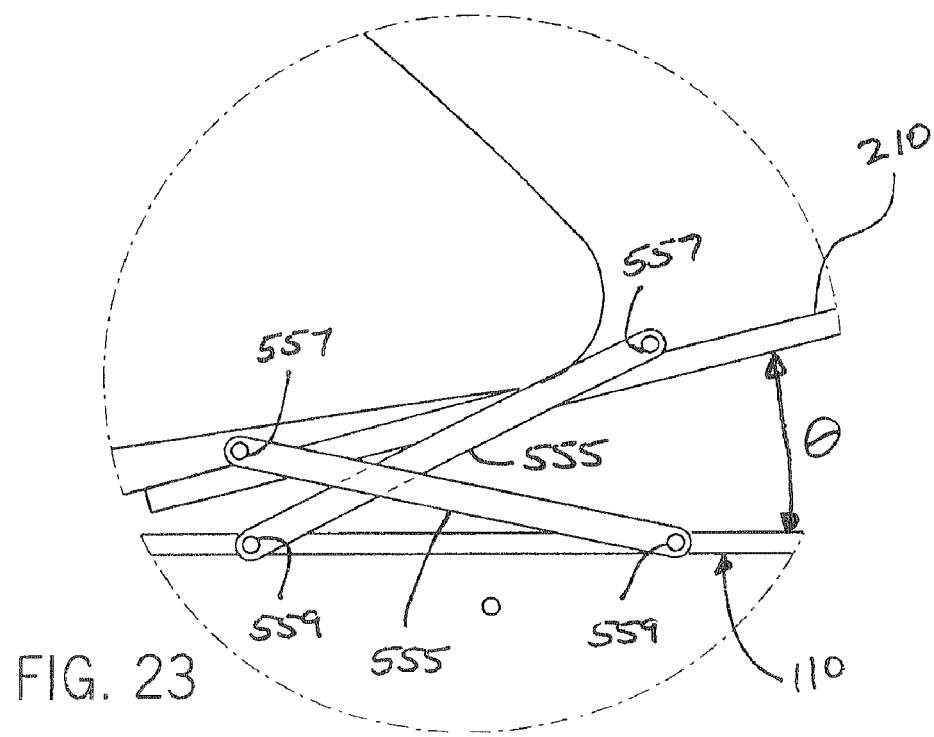
FIG. 23 is a detailed view of a translating cross-linkage seat tilt pivot per line 23-23 of FIG. 21.

Another translating seat tilt pivot is shown in FIGS. 18-23, where a cross-linkage based translating seat tilt pivot structure is used instead of the rack and pinion structure. Cross members 555 are used to couple the base 110 to the seat bracket 210. As seen in FIG. 23, pins or other pivotable connectors 557 are used to couple members 555 to the seat bracket 210. Likewise, pins or other pivotable connectors 559 are used to couple members 555 to the base 110, thus creating a cross-linkage structure.

Figure 18:
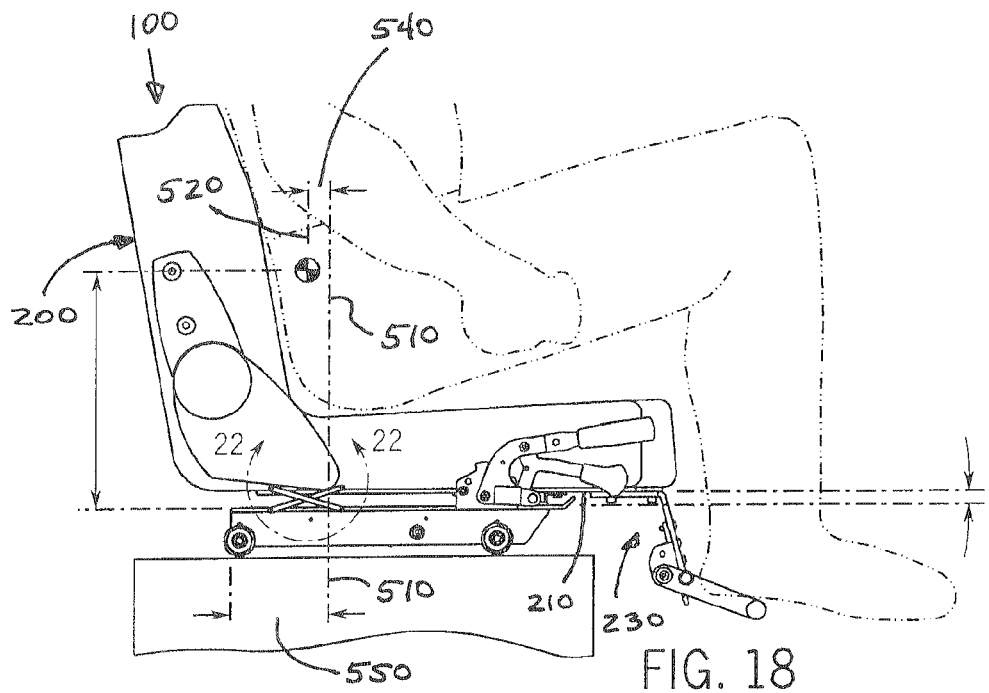
FIG. 18 is a side view of a seating system according to one or more embodiments of the present invention showing the seat in its most upright position and a cross-linkage based translating seat tilt pivot.
Figure 19:
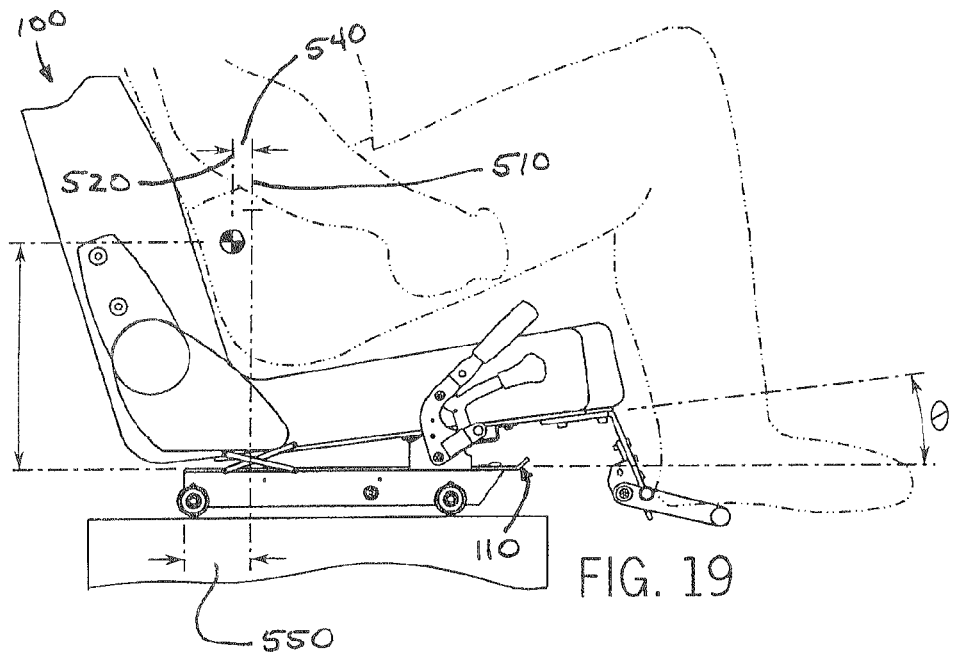
FIG. 19 is the seating system of FIG. 18 showing the seat in a tilted position.
Figure 20:
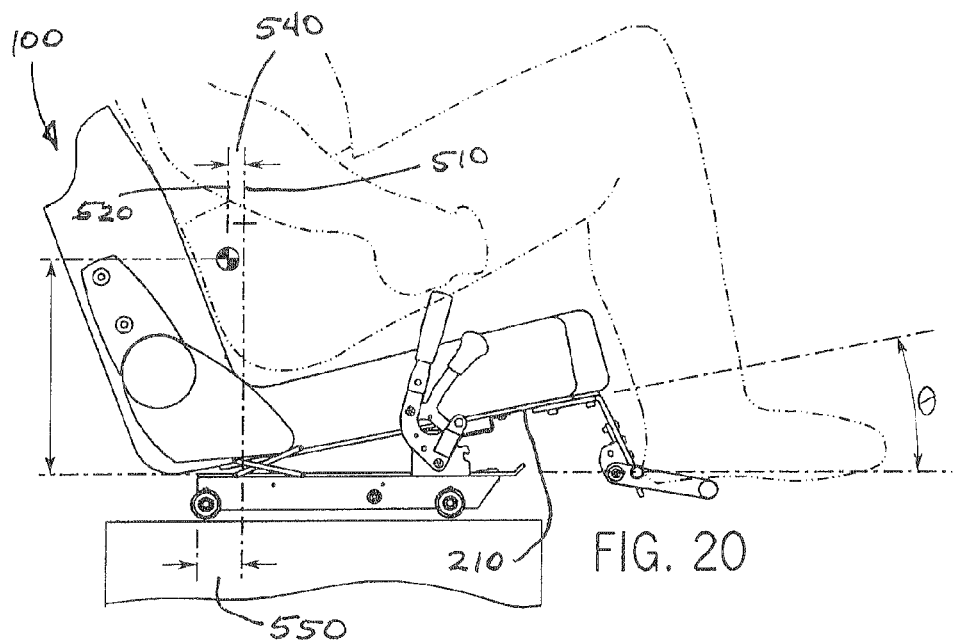
FIG. 20 is the seating system of FIG. 18 showing the seat in a tilted position.
Figure 21:
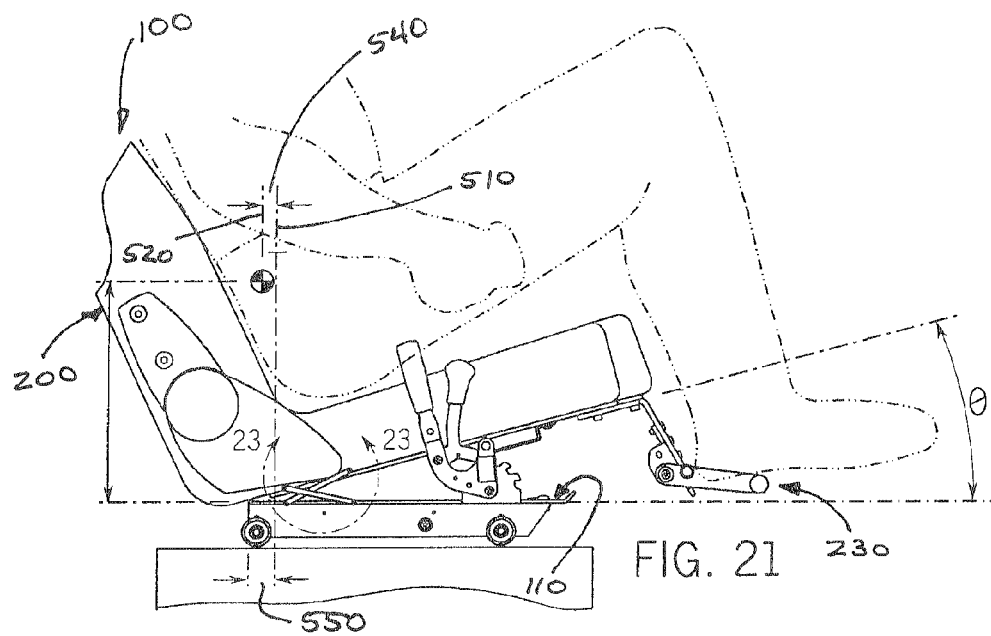
FIG. 21 is the seating system of FIG. 18 showing the seat in a tilted position.
Figure 22:
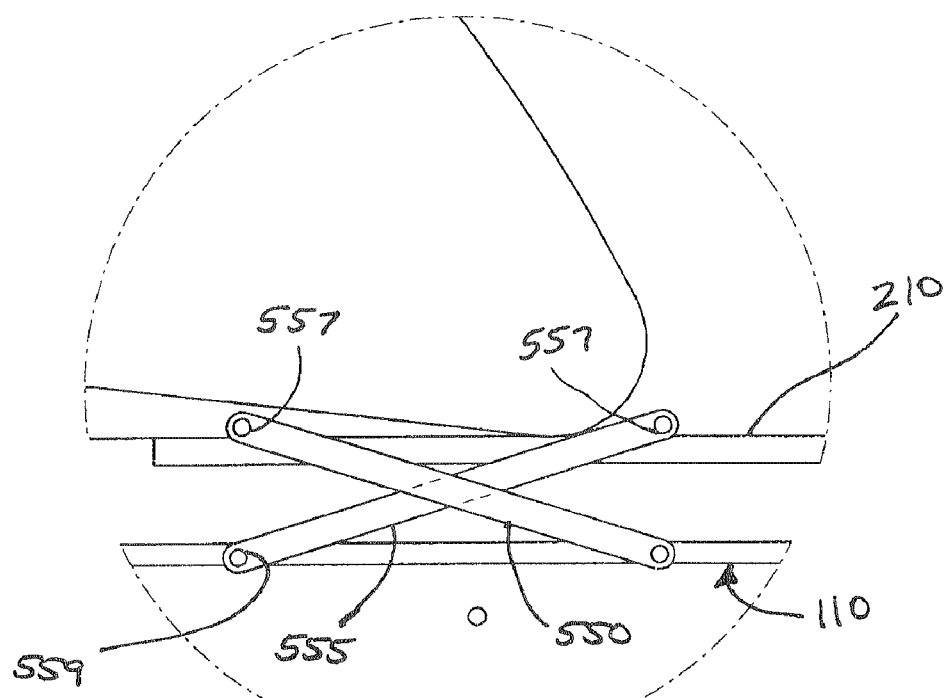
FIG. 22 is a detailed view of a translating cross-linkage seat tilt pivot per line 22-22 of FIG. 18.

As the seat 200 is tilted back (FIG. 18 shows a tilt angle Θ of 0°; FIG. 19 shows a tilt angle Θ of 7°; FIG. 20 shows a tilt angle Θ of 10°; FIG. 21 shows a tilt angle Θ of 15°), the seat tilt pivot point 510 moves backward as the relative positions of the cross-linkage structure changes. Again the seat tilt pivot point 510 moves generally in concert with the loaded seat center of gravity 520 as seat 200 is tilted backward or forward. As with the rack and pinion configuration, the geometry of the cross-linkage structure and the properties of the loaded seat center of gravity 520 can be selected so that the seat tilt pivot point 510 is located approximately vertically below a loaded seat center of gravity throughout the range of tilt angles. The separation or gap 540 between the seat tilt pivot point 510 and loaded seat center of gravity 520 and the separation 550 of the seat tilt pivot point 510 and rear edge of base 110 can be used as explained in connection with the rack and pinion seat tilt pivot system of FIGS. 2-7 to measure and configure the cross-linkage seat tilt pivot and its translation characteristics. In some embodiments, grooves and followers can be used to link and guide members 555 in their movement relative to one another, if desired.

Unlike earlier seating systems, the user's body is maintained in a fixed position and no "bunching" of the user's legs and/or head is necessary. Thus, one or more of the shorter user vertical profiles (for example, vertical profile 370 in FIGS. 2-5) can be set to allow for easier motor vehicle ingress and egress for the user. As will be appreciated by those skilled in the art, such a seating system can be easily adapted to other setting in which movement of a seated user having limited physical abilities can be facilitated using an embodiment of the present invention.

The many features and advantages of the present invention are apparent from the written description, and thus, the appended claims are intended to cover all such features and advantages of the invention. Further, since numerous modifications and changes will readily occur to those skilled in the art, the present invention is not limited to the exact construction and operation as illustrated and described. Therefore, the described embodiments should be taken as illustrative and not restrictive, and the invention should not be limited to the details given herein but should be defined by the following claims and their full scope of equivalents, whether foreseeable or unforeseeable now or in the future.

What is claimed is:

1. A seating system comprising:
a mounting bracket comprising a first rack;
a tiltable seat assembly configured to move throughout a range of tilt angles relative to the mounting bracket, the seat assembly comprising:
a seat bracket comprising a first pinion engaging the first rack to provide a translating pivot axis about which the seat bracket rotates relative to the mounting bracket;
a seat cushion coupled to the seat bracket;
a back support adjustably coupled to the seat cushion and configured to be maintained in a fixed relation to the seat bracket throughout the range of tilt angles; and
a footrest adjustably coupled to the seat bracket and configured to be maintained in a fixed relation to the seat bracket throughout the range of tilt angles;
wherein the seat is configured to maintain the body position of a user seated on the seat throughout the range of tilt angles; and
a seat angle adjustment mechanism for adjusting and locking the seat assembly at a fixed tilt angle relative to the mounting bracket, the seat adjustment mechanism comprising:
a locking plate coupled to the mounting bracket, the locking plate comprising a plurality of locking positions corresponding to seat assembly tilt angles within the range of tilt angles; and
a spring-loaded handle assembly pivotably coupled to the locking plate, the handle assembly comprising:
a latch configured to selectively engage the locking plate locking positions;
a handle manually operable to move the latch into engagement with a selected locking position; and
a cam rod coupled to the latch and configured to engage an underside surface of the seat bracket to pivot the seat assembly.

2. The seating system of claim 1 wherein the seating assembly is mounted to the mounting bracket using the first rack and first pinion engagement in a position that maintains the center of gravity of a loaded seat assembly approximately directly above the translating pivot axis;
wherein the loaded seat assembly comprises the seat assembly with a user seated in a normal use position thereon; and
further wherein the translating pivot axis of the seating system is defined by the first rack and first pinion engagement and the radius of curvature of the first pinion.

3. The seating system of claim 2 wherein the seat bracket is coupled to one of the following:
a motor vehicle;
a personal mobility vehicle;
a wheelchair; or
a power wheelchair.

4. The seating system of claim 3 further comprising a plurality of pins coupled to the mounting bracket and engaging the first pinion to limit:
angular adjustment of the first pinion relative to the first rack; and
free motion of the first pinion with regard to the first rack.

5. The seating system of claim 4 wherein the seat angle adjustment mechanism further comprises a cam rod bracket coupled to the seat bracket, wherein the cam rod bracket:
holds the cam rod in engagement with the underside surface of the seat bracket; and
prevents the seat assembly from lifting up off of the cam rod.

6. The seating system of claim 1 wherein the mounting bracket comprises a second rack and further wherein the seat bracket comprises a second pinion engaging the second rack.

7. The seating system of claim 6 wherein the seat bracket is coupled to one of the following:
a motor vehicle;
a personal mobility vehicle;
a wheelchair; or
a power wheelchair.

8. The seating system of claim 7 further comprising a plurality of pins coupled to the mounting bracket and engaging the first pinion to limit:
angular adjustment of the first pinion relative to the first rack; and
free motion of the first pinion with regard to the first rack.

9. The seating system of claim 8 wherein the seat angle adjustment mechanism further comprises a cam rod bracket coupled to the seat bracket, wherein the cam rod bracket:
holds the cam rod in engagement with the underside surface of the seat bracket; and
prevents the seat assembly from lifting up off of the cam rod.

10. The seating system of claim 1 wherein the seat bracket is coupled to one of the following:
a motor vehicle;
a personal mobility vehicle;
a wheelchair; or
a power wheelchair.

11. The seating system of claim 1 further comprising a plurality of pins coupled to the mounting bracket and engaging the first pinion to limit:
angular adjustment of the first pinion relative to the first rack; and
free motion of the first pinion with regard to the first rack.

12. The seating system of claim 1 wherein the seat angle adjustment mechanism further comprises a cam rod bracket coupled to the seat bracket, wherein the cam rod bracket:
holds the cam rod in engagement with the underside surface of the seat bracket; and
prevents the seat assembly from lifting up off of the cam rod.

13. The seating system of claim 1 wherein the footrest is adjustable relative to the seat bracket and further wherein the back support is adjustable relative to the seat bracket.

14. A seating system comprising:
a mounting bracket comprising a first rack and a second rack;
a tiltable seat assembly configured to move throughout a range of tilt angles relative to the mounting bracket, the seat assembly comprising:
a seat bracket comprising a first pinion engaging the first rack and a second pinion engaging the second rack to provide a translating pivot axis about which the seat bracket rotates relative to the mounting bracket;
a seat cushion coupled to the seat bracket;

an adjustable back support coupled to the seat cushion and configured to be maintained in a fixed relation to the seat bracket throughout the range of tilt angles; and an adjustable footrest coupled to the seat bracket and configured to be maintained in a fixed relation to the seat bracket throughout the range of tilt angles;

wherein the seat is configured to maintain the body position of a user seated on the seat throughout the range of tilt angles; and a seat angle adjustment mechanism for adjusting and locking the seat assembly at a fixed tilt angle relative to the mounting bracket, the seat adjustment mechanism comprising:
  a locking plate coupled to the mounting bracket, the locking plate comprising a plurality of locking positions corresponding to seat assembly tilt angles within the range of tilt angles; and
  a spring-loaded handle assembly pivotably coupled to the locking plate, the handle assembly comprising:
    a latch configured to selectively engage the locking plate locking positions;
    a handle manually operable to move the latch into engagement with a selected locking position;
    a cam rod coupled to the latch and configured to engage an underside surface of the seat bracket to pivot the seat assembly;
    a cam rod bracket coupled to the seat bracket, wherein the cam rod bracket:
      holds the cam rod in engagement with the underside surface of the seat bracket; and
      prevents the seat assembly from lifting up off of the cam rod;
  a plurality of pins coupled to the mounting bracket, the plurality of pins engaging a plurality of guide holes to limit:
    minimum and maximum angular adjustments for the seat assembly; and
    free motion of the seat assembly relative to the mounting bracket.

* * * * *